(12) United States Patent　　(10) Patent No.: US 8,478,003 B2
Rikimaru et al.　　(45) Date of Patent: Jul. 2, 2013

(54) VEGETATION GROWTH CONDITION ANALYSIS METHOD, RECORDING MEDIUM ON WHICH PROGRAM IS RECORDED, AND VEGETATION GROWTH CONDITION ANALYZER

(75) Inventors: Atsushi Rikimaru, Niigata (JP); Kazuyoshi Takahashi, Niigata (JP); Hideki Shimamura, Tokyo (JP)

(73) Assignees: Pasco Corporation, Tokyo (JP); National University Corporation Nagaoka University of Technology, Nagaoka-shi (JP)

( * ) Notice: Subject to any disclaimer, the term of this patent is extended or adjusted under 35 U.S.C. 154(b) by 161 days.

(21) Appl. No.: 13/129,245

(22) PCT Filed: Nov. 13, 2009

(86) PCT No.: PCT/JP2009/069370
§ 371 (c)(1),
(2), (4) Date: May 13, 2011

(87) PCT Pub. No.: WO2010/055915
PCT Pub. Date: May 20, 2010

(65) Prior Publication Data
US 2011/0222738 A1　　Sep. 15, 2011

(30) Foreign Application Priority Data
Nov. 14, 2008　(JP) ................................. 2008-292705

(51) Int. Cl.
*G06K 9/00*　　(2006.01)
(52) U.S. Cl.
USPC ......................................... 382/110; 382/154

(58) Field of Classification Search
None
See application file for complete search history.

(56) References Cited

U.S. PATENT DOCUMENTS

| 6,683,970 | B1 | 1/2004 | Satake et al. | |
| 6,963,662 | B1 * | 11/2005 | LeClerc et al. | 382/154 |
| 7,046,841 | B1 * | 5/2006 | Dow et al. | 382/154 |
| 2008/0291081 | A1 * | 11/2008 | Nonaka et al. | 342/176 |

FOREIGN PATENT DOCUMENTS

| JP | 2001-45867 | 2/2001 |
| JP | 2002-171121 | 6/2002 |
| JP | 2005-189100 | 7/2005 |
| JP | 2008-46107 | 2/2008 |

OTHER PUBLICATIONS

Geometric and Radiometric Calibration of RADARSAT Images David Small, Francesco Holecz, Erich Meier, Daniel Nüesch, and Arnold Barmettler, May 24-30, 1997.*

(Continued)

*Primary Examiner* — Nancy Bitar
(74) *Attorney, Agent, or Firm* — Oblon, Spivak, McClelland, Maier & Neustadt, L.L.P.

(57) ABSTRACT

Vegetation growth condition analyzer, method and record medium using plural radar imaees of a ground surface of a same target area, which have been laken at multiple times during the year obtained from a flying body, e.g. an artificial satellite are disclosed. These images are stored in a map database and aligned wjth a criterion image. Extracting a backscatter coefficient of a specified target area in the criterion image from the map database and calibrating the backscatter coefficients of other radar images are entailed. Finally, calculating growth values of vegetation shown in the radar images by use of the calibrated backscatter coefficients are obtained.

15 Claims, 14 Drawing Sheets

OTHER PUBLICATIONS

Kazuyoshi Takahashi, et al., "Observation of the rice growth distribution using the multi-temporal RADARSAT data", Proc. of Annual Conference of Japan Society of Photogrammetry, Jun. 17-18, 2004, pp. 259-262 (with English-language translation).

Yuzo Suga, et al., "Extraction of backscattering change in paddy fields using RADARSAT data", Proc. of 27th Conference of Remote Sensing Society of Japan, Nov. 1999, pp. 191-192 (with English-language translation).

Kiyotada Sato, et al., "Multi-temporal data analysis of JERS-1/SAR for observing rice Growth", PROC. of 24th Conference of Remote Sensing Society of Japan, May 1998, pp. 29-30 (with English-language translation).

Shigeo Ogawa, "Means to estimate wet-rice planting area using space-borne SAR data", Agricultural Environment Research News, 2000, pp. 6-7 (with English-language translation).

Yuzo Suga, et al., "Analysis of Backscattering Characteristics of Paddy Fields using Space-Borne SAR Data —Comparison by Difference in RADARSAT Beam Mode-", PROC. of 29th Conference of Remote Sensing Society of Japan, Nov. 2000, pp. 63-66 (with English-language translation).

Yun Shao, et al., "Rice monitoring and production estimation using multitemporal RADARSAT", Remote Sensing of Environment, vol. 76, 2001, pp. 310-325.

Tomohisa Konishi, et al., "Rice crop growth monitoring using ENVISAT-1/ASAR AP mode", Proc. of SPIE, vol. 6749, 2007, pp. 1-9.

Zengyuan Li, et al., "Rice Monitoring Using ENVISAT ASAR Data in China", Proc. of the 2004 ENVISAT & ERS Symposium, Sep. 6-10, 2004, 5 pages.

* cited by examiner

FIG. 8

| PLACE | MAY 7 | MAY 31 | JUNE 24 | JULY 18 | AUGUST 11 | SEPTEMBER 4 |
|---|---|---|---|---|---|---|
| SHOPPING CENTER | 7.19 | 7.44 | 7.43 | 7.38 | 7.48 | 7.16 |
| TEMPORARY HOUSING | 7.28 | 7.25 | 7.24 | 7.16 | 7.32 | 7.25 |
| REGULATING RESERVOIR | -21.29 | -22.72 | -22.54 | -21.13 | -22.00 | -21.83 |
| PLAYGROUND | -15.62 | -17.13 | -16.60 | -16.26 | -15.88 | -15.19 |
| PARKING AREA (PARK) | -19.87 | -20.73 | -20.78 | -20.74 | -18.64 | -18.75 |
| POND (PARK) | -17.92 | -19.54 | -18.88 | -17.91 | -19.30 | -20.12 |
| REFLECTOR | 5.13 | 6.96 | 7.70 | 4.96 | 5.61 | 4.26 |

FIG. 10
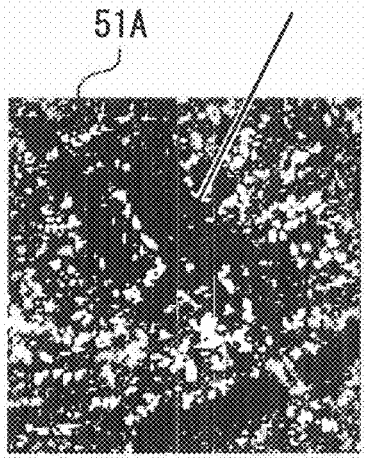
ORIGINAL IMAGE
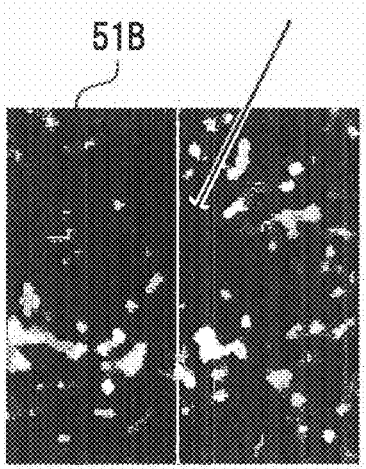
AFTER APPLYING MEDIAN FILTER PROCESSING
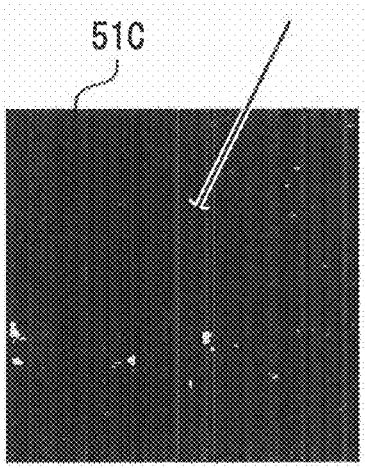
AFTER APPLYING LEAST-VALUE FILTER PROCESSING FIG. 11
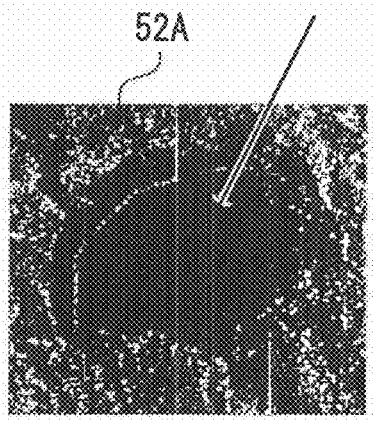
ORIGINAL IMAGE
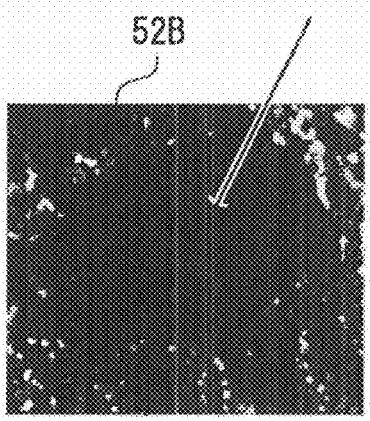
AFTER APPLYING MEDIAN FILTER PROCESSING
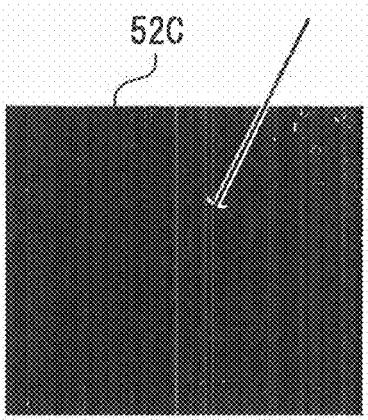
AFTER APPLYING LEAST-VALUE FILTER PROCESSING

VEGETATION GROWTH CONDITION ANALYSIS METHOD, RECORDING MEDIUM ON WHICH PROGRAM IS RECORDED, AND VEGETATION GROWTH CONDITION ANALYZER

TECHNICAL FIELD

The present invention relates to a vegetation growth condition analysis method suitable for analyzing vegetation growth conditions using radar image data obtained from a radar device which is installed on a flying body such as artificial satellites, etc. and which takes photos of a wide range of a surface of the ground of a photo-taking target area to obtain information about conditions of the surface of the ground, a recording medium on which a computer program for executing processing of the method is recorded, and a vegetation growth condition analyzer.

BACKGROUND ART

Conventionally, for estimation and forecasting of a yield of agricultural produce (vegetation growth analysis), an algorithm has been written based on optical remote sensing data obtained from an artificial satellite, an aircraft, etc., and vegetation growth analysis using such algorithm has been put in practical use. However, in Japan, because it has four seasons and a rainy season, and has many rainy days and cloudy days throughout the year, stable observation of the surface of the ground is difficult with optical remote sensing which is influenced by weather.

Also, when a wide variety of agricultural produce is produced in small quantities in the land of complex topography elongated from north to south as in Japan, precise agricultural management is necessary. However, there has been a circumstance so far that it is difficult to obtain high precision data based on which growth conditions can be grasped in cultivated field units, other than optical remote sensing data.

On the other hand, a synthetic aperture radar (SAR) is available as an example of the active-type sensor that measures reflective waves of electric waves (microwave pulses) irradiated to the surface of the ground. The synthetic aperture radar is capable of taking photos of a wide area of the surface of the ground, day and night, regardless of weather, using the characteristics of microwaves. Also, although the synthetic aperture radar in the past has problems in resolution (fineness) compared with optical remote sensing, some leading edge satellite-mounted-type synthetic aperture radar has the resolution of 1 m or below, and it is becoming possible to obtain high-resolution images.

Past studies on agricultural produce carried out using a synthetic aperture radar include the following:

Estimation of paddy-field rice planted acreage concurrently using optical remote sensing data and SAR images taken at multiple times of a year;

Estimation of paddy-field rice planted acreage based on multiple-wavelength and multiple-polarization SAR images;

Study on type classification of agricultural produce based on SAR images taken at multiple times of a year.

These studies were made abroad, and also many papers were published, however, they did not directly lead to growth forecasting of agricultural produce such as paddy-field rice, etc.

Then, studies are being made on monitoring growth conditions of paddy-field rice using SAR images taken at multiple times of a year (see, for example, Non-patent Document 1).

Some of the inventors of the present application have also announced a result of a study on grasping growth conditions of paddy-field rice using SAR images taken at multiple times of a year (see Non-patent Document 2). An analysis result as shown in FIG. 1 through FIG. 3 was obtained by the study described in Non-patent Document 2.

FIG. 1 shows examples of radar images of a target area taken at plural times, and specifically shows, for each observation day, growth and reflection characteristics, conditions of paddy fields, paddy-field rice covering conditions of paddy fields, and radar images. In this example, the radar images were taken by the C band of PADARSAT. Radar images 1A, 1B, 1C, and 1D at four times, i.e., May 22, June 15, July 9, and August 2, were produced, and from these radar images, it can be grasped that the growth conditions of paddy-field rice have changed on the whole.

FIG. 2 shows a relationship between paddy-field rice coverage and a radar backscatter coefficient (backscattered components of microwaves from a radar device), and the horizontal axis indicates paddy-field rice coverage (%) and the vertical axis indicates a radar backscatter coefficient (dB). As shown in FIG. 2, paddy-field rice coverage and a radar backscatter coefficient have a strong correlation, and by applying the method of least squares to data (paddy-field rice coverage and backscatter coefficients) of multiple observation points, a regression line 2 representing a relationship between paddy-field rice coverage and a radar backscatter coefficient can be obtained.

FIG. 3 shows radar backscatter coefficient distributions by cultivated field blocks at respective times. Thus, by producing radar backscatter coefficient distribution maps by cultivated field blocks at respective times 3A, 3B, 3C, and 3D using radar images, it is possible to grasp growth conditions of paddy-field rice by cultivated field blocks.

Non-patent Document 1; Zengyuan Li, Guoqing Sun, Mike Wooding, Yong Pang, Yanfang Dong, Erxue Chen and Bingxiang Tan "Rice Monitoring Using Envisat Asar Data in China", Proc. of the 2004 Envisat & ERS Symposium, Salzburg, Austria 6-10 Sep. 2004 (ESA SP-572, April 2005)

Non-patent Document 2; Kazuyoshi Takahashi, Hiroaki Abe, Atsushi Rikimaru, Yukio Mukai, "Grasping Paddy-field Rice Growth Distributions Using Time-series RADARSAT Data", Japan Society of Photography and Remote Sensing, Annual Academic Lectures, Tokyo Big Sight (Tokyo), Jun. 17 and 18, 2004

DISCLOSURE OF THE INVENTION

Problems to be Solved by the Invention

Meanwhile, although Non-patent Document 1 describes the research content about monitoring of paddy-field rice using SAR images at multiple times, it does not describe the relationship between backscatter coefficients of SAR images and vegetation growth.

On the other hand, a correlation of backscatter coefficients of satellite SAR data and vegetation growth conditions has been made known by the study described in Non-patent Document 2. However, because backscatter coefficients of SAR images are affected by conditions of the atmosphere at the time of image taking and fluctuation in the system, in order to accurately grasp growth conditions of paddy-field rice using SAR images taken at multiple times, calibration of backscatter coefficients of SAR images taken at different times is necessary. The above-described study does not describe calibration of backscatter coefficients of SAR images taken at different times, and it cannot be said that the above-described study accurately represents growth conditions of paddy-field rice at multiple times.

The present invention has been made in view of the above-described circumstances, and aims to enable analyzing vegetation growth conditions at multiple times of a year accurately using radar images obtainable from a flying body such as artificial satellites, etc.

Means for Solving the Problems

A vegetation growth condition analysis method and a recording medium recording a computer program thereon according to an aspect of the present invention comprise steps or functions of: acquiring a radar image of a ground surface of a same target area taken at multiple times of a year by a radar device mounted on a flying body; storing the plurality of radar images acquired in the acquiring step in a map database; while using as a criterion image a radar image of the plurality of radar images stored in the map database, taken at a predetermined time in the multiple times of a year, align other radar images than the criterion image of the plurality of radar images, taken at other times than the predetermined time in the multiple times in a year, with the criterion image, respectively; extracting backscatter coefficients of specified areas in the plurality of radar images; based on a backscatter coefficient of a specified area in the criterion image of the plurality of radar images stored in the map database, calibrating backscatter coefficients of other radar images than the criterion image of the plurality of radar images; and based on a correlation between backscatter coefficients of radar images and growth values of vegetation shown in the radar images, calculating growth values of vegetation shown in other radar images than the criterion image of the plurality of radar images, whose backscatter coefficients have been calibrated in the calibrating step, from the backscatter coefficients thereof calibrated in the calibrating step.

A vegetation growth condition analyzer according to an aspect of the present invention comprises: an acquisition unit configured to acquire a radar image of a ground surface of a same target area taken at multiple times of a year by a radar device mounted on a flying body; a storage unit configured to store the plurality of radar images acquired by the acquisition unit in a map database; an alignment unit configured to align, while using as a criterion image a radar image of the plurality of radar images stored in the map database, taken at a predetermined time in the multiple times of a year, other radar images than the criterion image of the plurality of radar images, taken at other times than the predetermined time in the multiple times of a year, with the criterion image, respectively; an extraction unit configured to extract backscatter coefficients of specified areas in the plurality of radar images; a calibration unit configured to calibrate backscatter coefficients of other radar images than the criterion image of the plurality of radar images stored in the map database based on a backscatter coefficient of a specified area in the criterion image of the plurality of radar images; and a calculation unit configured to calculate growth values of vegetation shown in other radar images than the criterion image of the plurality of radar images, whose backscatter coefficients have been calibrated by the calibration unit, from the backscatter coefficients thereof calibrated by the calibration unit, based on a correlation between backscatter coefficients of radar images and growth values of vegetation shown in the radar images.

According to an aspect of the present invention, based on a backscatter coefficient of a radar image taken at a predetermined time, backscatter coefficients of radar images taken at respective times are calibrated. Then, based on calibrated backscatter coefficients, growth values of vegetation shown in radar images at respective times are calculated. Therefore, it is possible to calculate growth values indicating accurate growth conditions of vegetation such as agricultural produce, etc. at respective times.

Effects of the Invention

As described above, according to the present invention, vegetation growth conditions at multiple times of a year can be accurately analyzed using radar images at multiple times obtainable from a flying body.

BRIEF DESCRIPTION OF DRAWINGS

FIG. 8 is a diagram showing backscatter coefficients of characteristic areas (a median filter applied).

FIG. 10 is a diagram showing effects of correcting (filter processing) backscatter coefficients (the case of a parking area of a shopping center).

FIG. 11 is a diagram showing effects of correcting (filter processing) backscatter coefficients (the case of a regulating reservoir).

BEST MODES FOR CARRYING OUT THE INVENTION

Below, description will be made with respect to an example of a best mode for carrying out the present invention referring to attached drawings. Description will be made in order according to the following items.

1. Outline of system
2. Vegetation growth condition analyzer
3. Paddy-field rice growth forecasting process
4. Measurement results, etc.

5. Others
1. Outline of System

Figure 1:
FIG. 1 is a diagram illustrating examples of radar images taken at multiple times.
Figure 2:
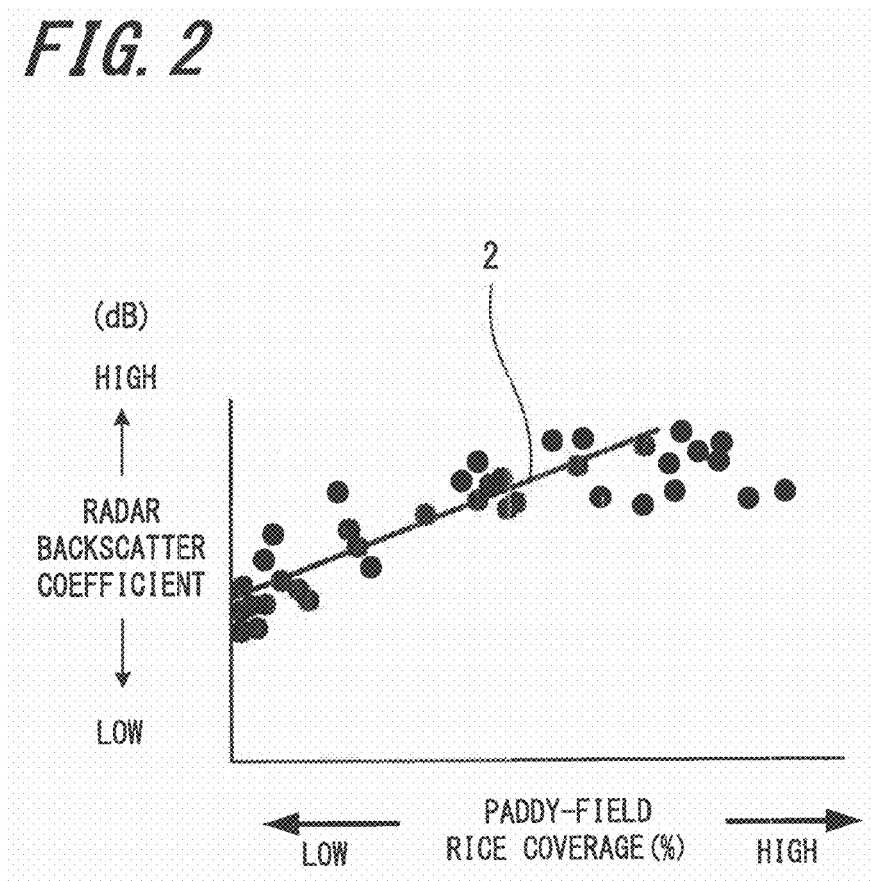
FIG. 2 is a diagram illustrating a relationship between paddy-field rice coverage and a radar backscatter coefficient.
Figure 3:
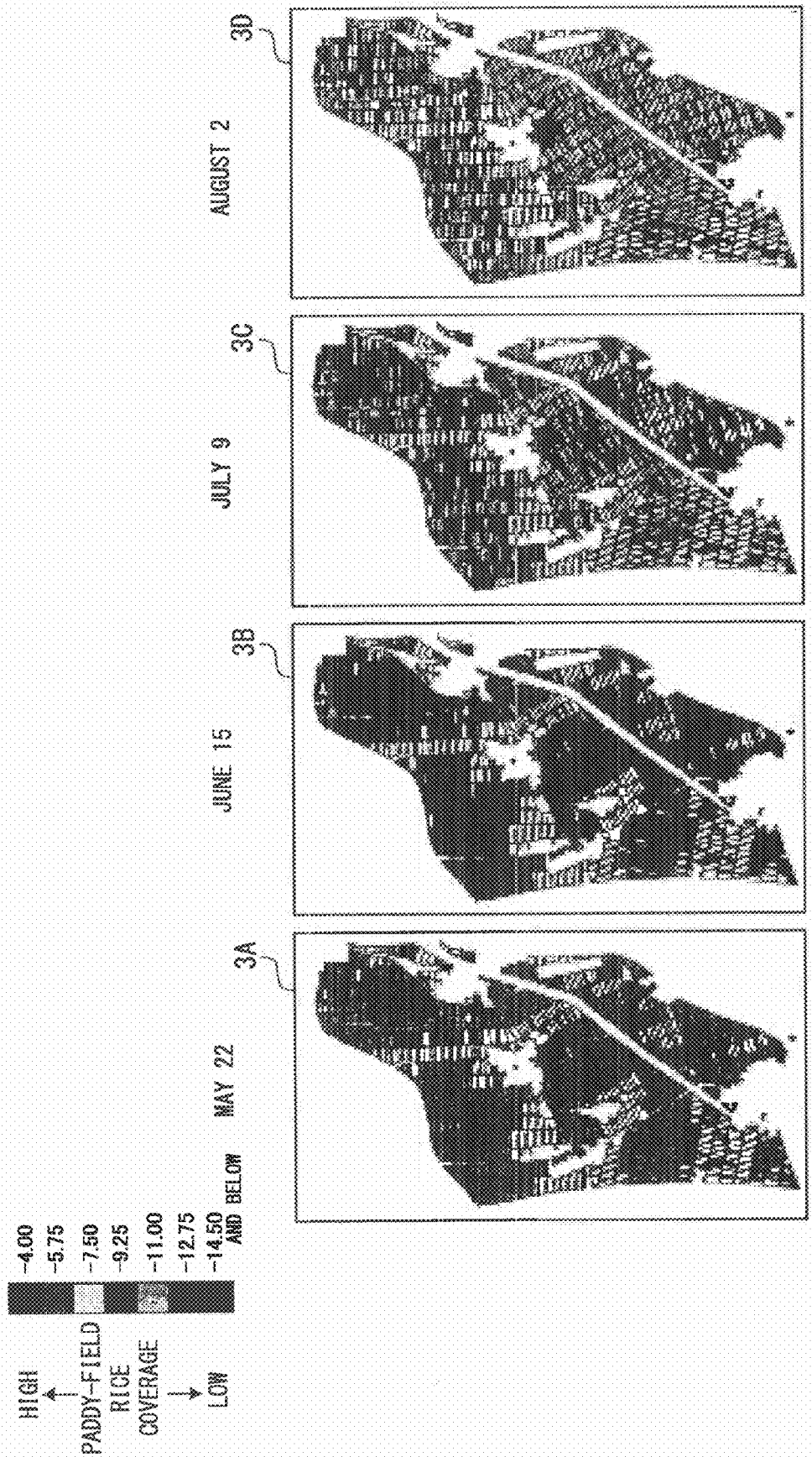
FIG. 3 is a diagram illustrating exemplary distribution maps of radar backscatter coefficients by cultivated field blocks.
Figure 4:
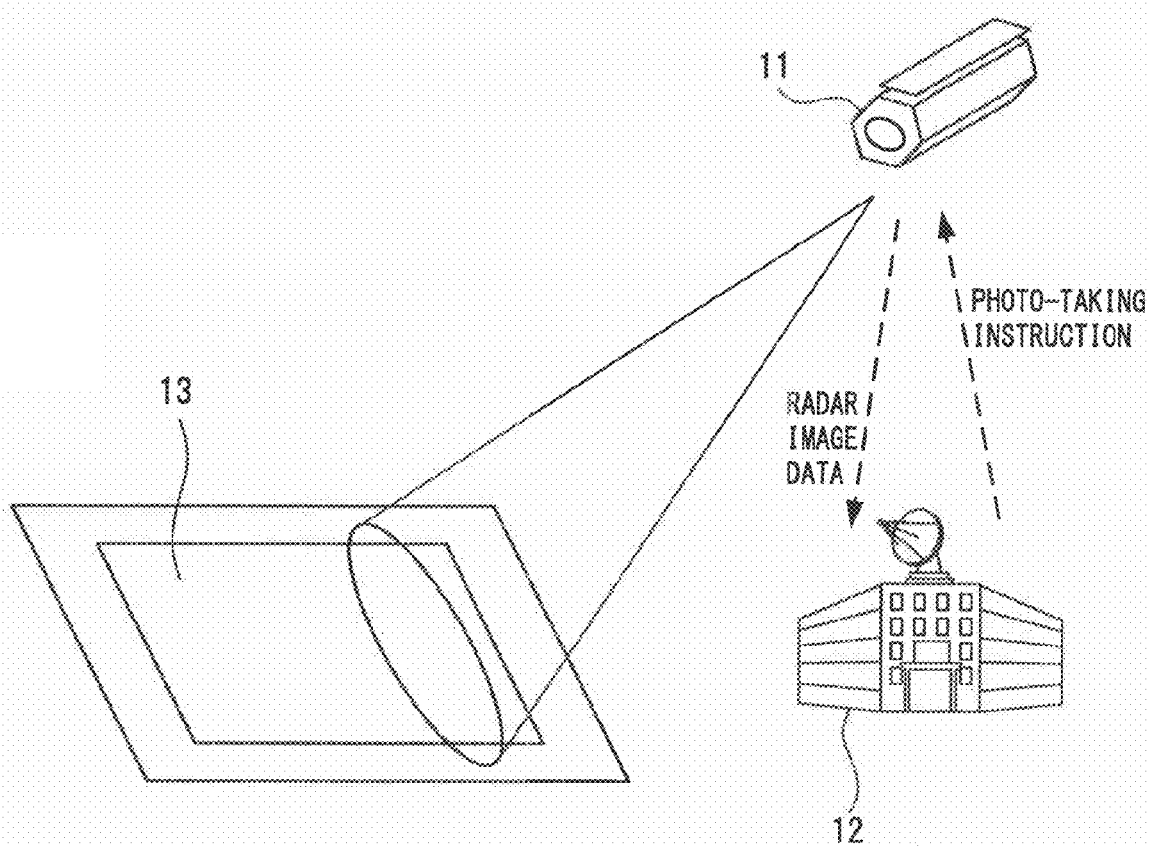
FIG. 4 is a diagram illustrating an outline of a system according to an embodiment of the present invention.

FIG. 4 shows an outline of a system to which a vegetation growth condition analyzer of the present invention is applied.

In the present embodiment, as an example of a radar device, a synthetic aperture radar (SAR) is mounted on an artificial satellite, and photos of a surface of the ground are taken by the synthetic aperture radar according to instructions from a data analysis center 12. Herein below, a synthetic aperture radar mounted on an artificial satellite is referred to as "a satellite SAR".

A satellite SAR 11 mounted on an artificial satellite takes photos of a cultivated field 13 on a surface of the ground, while going around a predetermined orbit, on a regular basis or as needed according to instructions from the data analysis center 12, and transmits data of photos taken (radar image data) to the data analysis center 12. In this example, it is assumed that as agricultural produce, paddy-field rice is cultivated in the cultivated field 13.

The data analysis center 12 generates a plan for taking photos in line with a growth calendar, transmits to the satellite SAR 11 wireless signals including instructions for taking photos based on the photo-taking plan, and receives data of photos taken by the satellite SAR 11 (radar image data) via an antenna.

A later-described vegetation growth condition analyzer 20 carries out synthetic aperture processing and predetermined correction (calibration) to received radar image data, and generates radar images at multiple times whose radar backscatter coefficients (also simply called as "backscatter coefficient") have been calibrated, distribution maps of calibrated backscatter coefficients, etc.

In order to carry out growth evaluation of paddy-field rice in a target area in real time, in the present invention, calibration of backscatter coefficient values of time-series images of the target area is carried out based on an image obtained initially or obtained at a predetermined time. By carrying out such calibration of backscatter coefficient values, a more practical paddy-rice growth forecasting system can be realized in which effects of fluctuation according to photo-taking times have been considered.

The following three methods are conceivable as the method for calibrating backscatter coefficient values of time-series images.

(1) A method that a criterion reflecting plate (for example, a corner reflector) is placed in a target area, backscatter coefficient values of criterion reflecting plates are extracted from obtained SAR images of the target area, and the extracted values are used to obtain regression lines (calibration lines) for calibrating backscatter coefficient values of time-series images (2) A method that low fluctuation areas are extracted from obtained SAR images, and using backscatter coefficient values of such low fluctuation areas, regression lines (calibration lines) for calibrating backscatter coefficient values of time-series images are obtained (3) A method combining the method (1) and the method (2)

2. Vegetation Growth Condition Analyzer

[Constitution of a Vegetation Growth Condition Analyzer]

Figure 5:
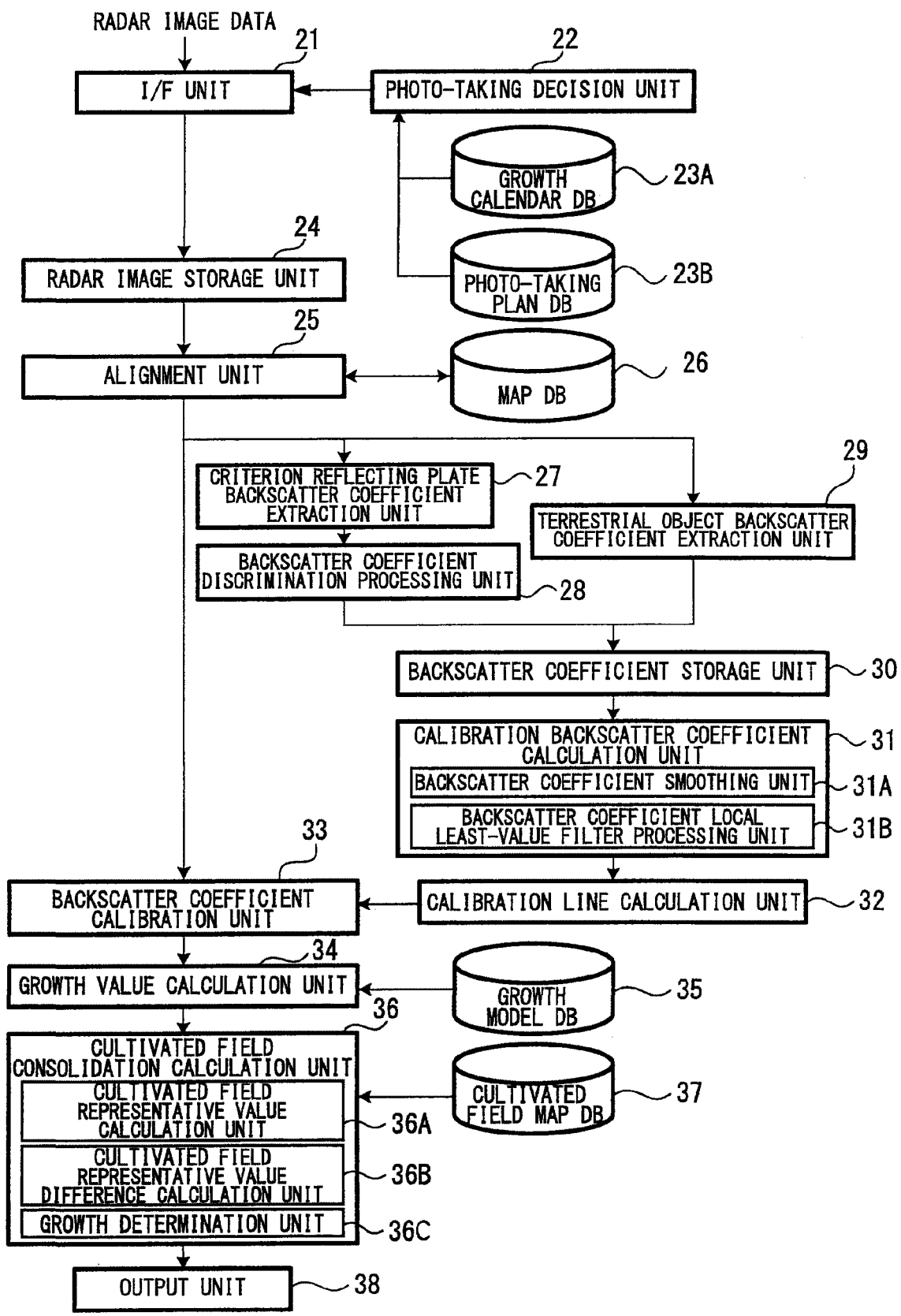
FIG. 5 is a block diagram illustrating an internal structure of a vegetation growth condition analyzer according to an embodiment of the present invention.

FIG. 5 illustrates a functional block diagram of the vegetation growth condition analyzer 20 according to an embodiment of the present invention. The vegetation growth condition analyzer 20 carries out the above-described calibration of backscatter coefficient values of time-series images, and generates data for forecasting vegetation growth conditions. It is assumed that the vegetation growth condition analyzer 20 is installed in the data analysis center 12, however, it may be installed on a satellite together with the satellite SAR 11 or distributed to the data analysis center 12 and the satellite SAR 11. Each function of the vegetation growth condition analyzer 20 may be realized either by hardware or software, or by combination of them.

The vegetation growth condition analyzer 20 of the present embodiment includes an I/F unit 21, a photo-taking decision unit 22, a radar image storage unit 24, an alignment unit 25, a criterion reflecting plate backscatter coefficient extraction unit 27, a backscatter coefficient discrimination processing unit 28, and a terrestrial object backscatter coefficient extraction unit 29. Further, the vegetation growth condition analyzer 20 includes a backscatter coefficient storage unit 30, a calibration backscatter coefficient calculation unit 31, a calibration line calculation unit 32, a backscatter coefficient calibration unit 33, a growth value calculation unit 34, a cultivated field consolidation calculation unit 36, and an output unit 38. Furthermore, the vegetation growth condition analyzer 20 includes a growth calendar database (hereinafter called a growth calendar DB) 23A, a photo-taking plan database (hereinafter called a photo-taking plan DB) 23B, a map database (hereinafter called a map DB) 26, a growth model database (hereinafter called a growth model DB) 35, and a cultivated field map database (hereinafter called a cultivated field map DB) 37.

The I/F unit 21 is a part of an acquisition unit, and is provided with functions of a so-called interface for taking in data of photos taken by the satellite SAR 11. The I/F unit 21 is provided with functions of a communication unit, and can transmit instructions from the photo-taking decision unit 22 to the satellite SAR 11 to cause the satellite SAR 11 to carry out photo-taking. The data of taken photos is data of radar images taken in a planned manner based on the growth calendar of paddy-field rice registered in the growth calendar DB 23A and the photo-taking times (cycle) of a satellite registered in the photo-taking plan DB 23B.

In the case of paddy-field rice for example, the growth calendar is a cultivating calendar including, starting with a rice transplanting stage in May, a tillering stage, a peak tiller stage, a young panicle forming stage, a heading stage, a ripening stage, and a full ripened stage in September. Artificial satellites currently launched into orbits with mounted synthetic aperture radars include, for example, the one whose observation cycle is 11 days.

The photo-taking decision unit 22 makes a decision on the time to take radar images into the I/F unit 21 considering the growth calendar and the photo-taking cycle of a satellite. Examples of scheduled photo-taking dates (data acquisition dates) are shown below.

| Scheduled photo-taking date: | Elapsed days; | Stage: |
| --- | --- | --- |
| May 7 | Zero day | Rice transplanting |
| May 31 | 24 days | Tillering |
| June 24 | 38 days | Peak tiller |
| July 18 | 72 days | Young panicle forming |
| August 11 | 96 days | Heading |
| September 4 | 120 days | Ripening |

The photo-taking decision unit 22 may be configured to set the pixel size of images to be taken according to the target area for carrying out evaluation of growth of paddy-field rice. For example, when carrying out detailed evaluation, it is preferable to set the ground resolution high (for example, to 1 m).

The radar image storage unit 24 stores time-series radar images taken at predetermined times in the map DB 26. The map DB 26 is formed in a non-volatile memory device such as a hard disk, a flash memory, etc.

The alignment unit 25 carries out geometric (positional) processing to radar images such that the radar images can be superimposed on a map based on map data stored in the map DB 26. Also, the alignment unit 25 supplies radar images after having been subjected to alignment to the backscatter coefficient calibration unit 33, the criterion reflecting plate backscatter coefficient extraction unit 27, and the terrestrial object backscatter coefficient extraction unit 29.

The criterion reflecting plate backscatter coefficient extraction unit 27 extracts backscatter coefficients of criterion reflecting plates appearing in radar images. For such criterion reflecting plates, various reflecting plates may be applied, for example, a corner reflector described in "Calibration and Validation Experiments of Synthetic Aperture Radar PAL-SAR on Board of the Advanced Land Observing Satellite", Yuuta Kamikawa, Kazuo Ohuchi, 2006 Undergraduate Thesis, Kochi University of Technology, Engineering Department (Literature 1).

When using a reflecting plate in the observation target area, backscatter coefficient values of reflecting plates appearing in radar images taken at two times of a year are extracted, respectively, calibration lines for carrying out calibration of backscatter coefficients based on backscatter coefficient values of a criterion image is obtained, and backscatter coefficients of other images taken at the following or other times are calibrated using the obtained calibration lines. As described in Literature 1 also, it is preferable that the reflecting plate is installed with the dimensions, shape, number of units, and direction appropriately adjusted as needed according to the band (wavelength) of microwaves irradiated to the surface of the ground and the orbit (photo-taking direction) of the artificial satellite.

[Criterion Reflecting Plate (Corner Reflector)]

Figure 6:
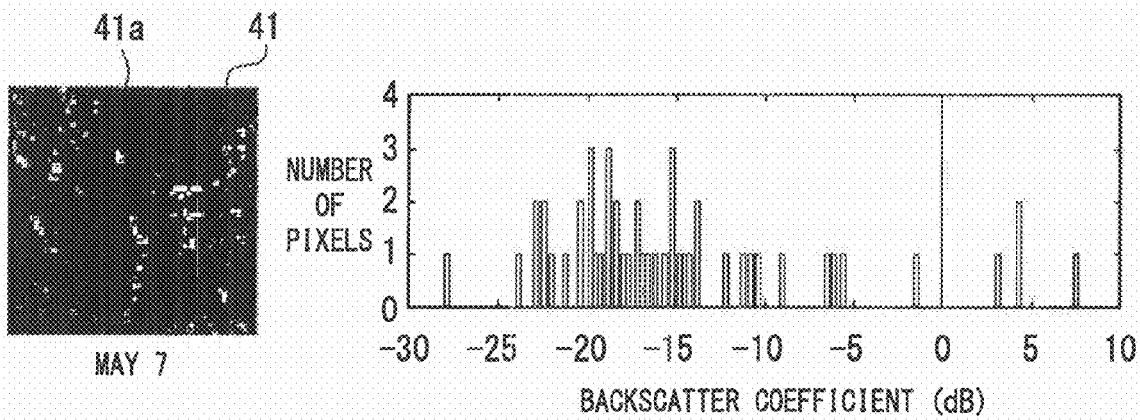
FIG. 6 is a diagram for use in describing a corner reflector.

FIG. 6 is a diagram illustrating a radar image and a measurement result of backscatter coefficients of the radar image when a corner reflector is installed as a reflecting plate in an arbitrary observation target area. The left side part of the diagram shows the radar image and the right side part of the diagram shows a graph of a histogram (frequency distribution) of a backscatter coefficient.

Figure 7:
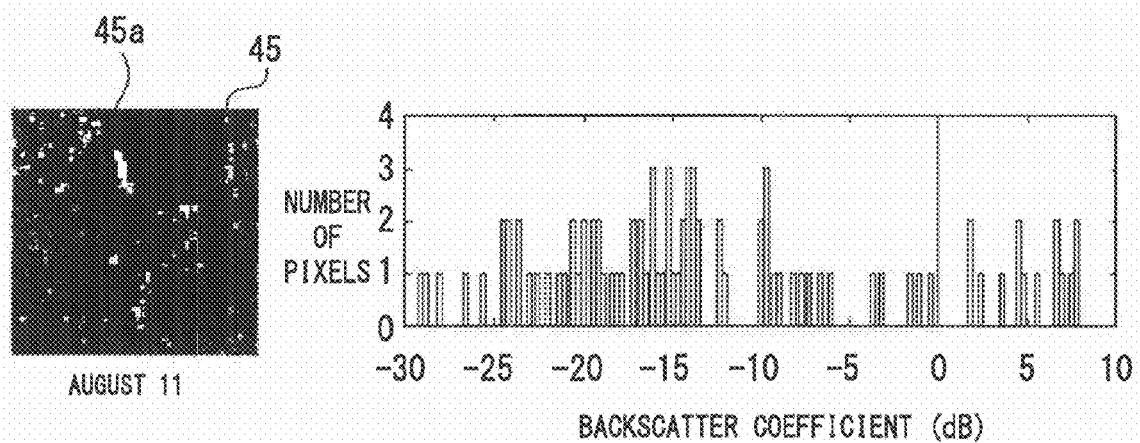
FIG. 7 is another diagram for use in describing a corner reflector.

The number of pixels corresponding to a corner reflector 41*a* appearing in a radar image 41 of May 7 shown in FIG. 6, that is, the number of pixels with the backscatter coefficient of 0 dB or greater is 4, and the average backscatter coefficient of the pixels corresponding to the corner reflector 41*a* is 5.13 dB. Likewise, the number of pixels corresponding to a corner reflector 45*a* appearing in a radar image 45 of August 11 shown in FIG. 7 is 14, and the average backscatter coefficient of the pixels corresponding to the corner reflector 45*a* is 5.61 dB.

Thus, depending on the time, the number of pixels corresponding to a corner reflector and the average backscatter coefficient of the pixels corresponding to the corner reflector vary, and therefore, such information is reflected on calibration of backscatter coefficients.

The backscatter coefficient discrimination processing unit 28 determines whether backscatter coefficients of criterion reflecting plates extracted by the criterion reflecting plate backscatter coefficient extraction unit 27 are suitable for use, and when extracted backscatter coefficients of criterion reflecting plates are in a saturation condition, that is, when a pixel having the same backscatter coefficient value as that of the corner reflector (e.g., the average backscatter coefficient of the corner reflector as described above) is present in other places than the place where the corner reflector is installed in a criterion image, the backscatter coefficients extracted by the criterion reflecting plate backscatter coefficient extraction unit 27 are not used. This is because that when backscatter coefficients of criterion reflecting plates are in a saturation condition, precise information on backscatter coefficients of criterion reflecting plates cannot be obtained and accordingly accurate calibration cannot be carried out.

The terrestrial object backscatter coefficient extraction unit 29 extracts backscatter coefficients of terrestrial objects (artificial structures, ponds, playgrounds, etc.) appearing in radar images. A low fluctuation area in radar images is determined based on backscatter coefficients extracted by the terrestrial object backscatter coefficient extraction unit 29. Alternatively, a terrestrial object showing the characteristics of a low fluctuation area is specified in advance based on past data, and such terrestrial object may be used.

[Radar Backscatter Coefficients of Multiple Points at Multiple Times]

Figure 9:
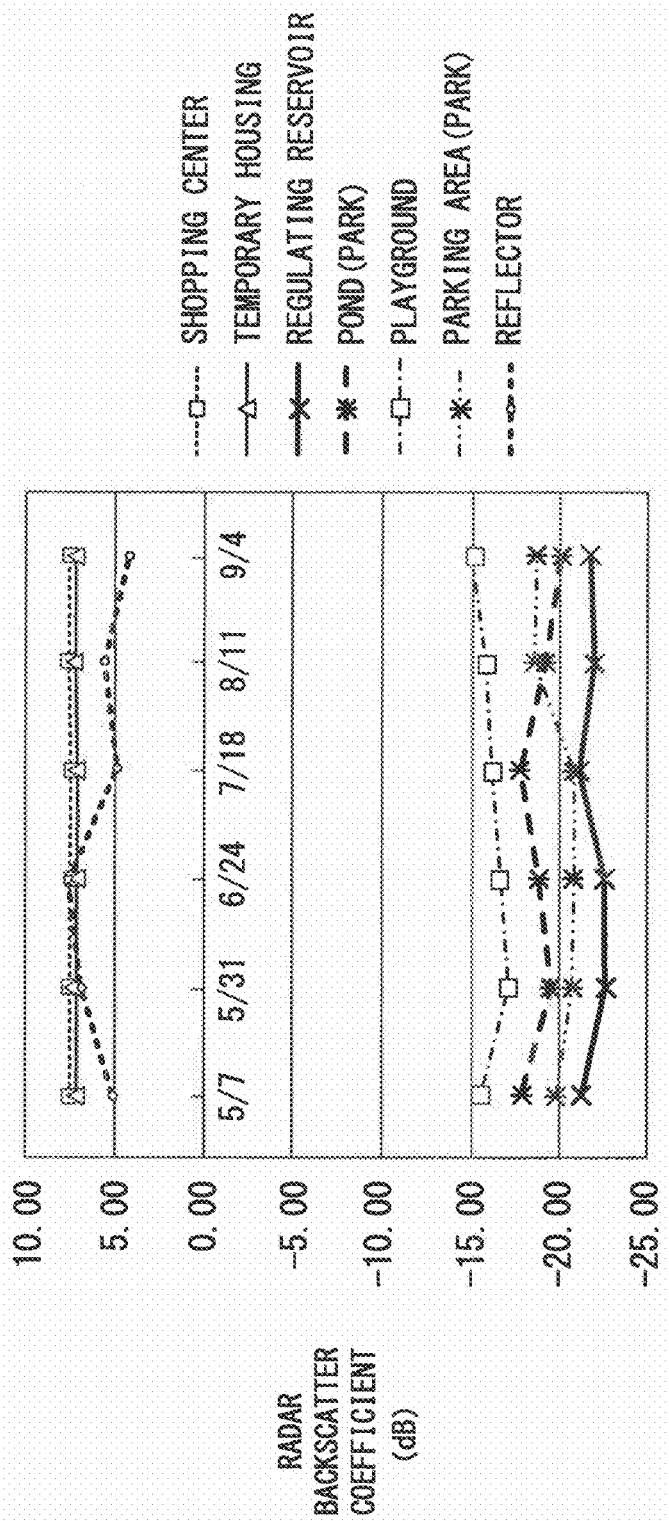
FIG. 9 is a diagram showing changes with passage of time of backscatter coefficients of characteristic areas (a median filter applied).

FIG. 8 and FIG. 9 show examples of radar backscatter coefficients (dB) of multiple points as characteristic areas, extracted from radar images taken at multiple times as phototaking dates, respectively. Note that the backscatter coefficients in FIG. 8 and FIG. 9 are those obtained by applying a later-described median filter serving as the smoothing process to the extracted backscatter coefficients.

FIG. 8 shows data of backscatter coefficients of 7 points serving as characteristic areas, i.e., a shopping center, a temporary housing, a regulating reservoir, a playground, a parking area (park), a pond (park), and a corner reflector, extracted from radar images taken on May 7, May 31, June 24, July 18, August 11, and September 4 serving as photo-taking dates. Each data is the one obtained by averaging backscatter coefficient values of pixels constituting each characteristic area.

FIG. 9 shows the data shown in FIG. 8 in a graph form to illustrate changes with lapse of time in backscatter coefficients of respective characteristic areas. For example, the shopping center and the temporary housing in which changes with passage of time in radar backscatter coefficients are relatively small and radar backscatter coefficients are relatively large can be identified as candidates for the low fluctuation area which will serve as a criterion when calibrating backscatter coefficients of radar images. Also, it is possible to identify the regulating reservoir in which changes with passage of time in backscatter coefficients are relatively small and backscatter coefficients are relatively small as a candidate for the low fluctuation area. A radar image at an initial or predetermine time, in which any of such candidate areas is shown, is used as a criterion image in calibration of backscatter coefficients of radar images at respective times.

Now, returning to the description of the vegetation growth condition analyzer shown in FIG. 5, the backscatter coefficient storage unit 30 stores backscatter coefficients of criterion reflecting plates and terrestrial objects showing characteristics of low fluctuation areas extracted from radar images.

The calibration backscatter coefficient calculation unit 31 carries out smoothing processing (median filter processing) and/or local least-value filter processing to backscatter coefficients stored in the backscatter coefficient storage unit 30 to obtain backscatter coefficients for use in calculating calibration lines, and includes a backscatter coefficient smoothing unit 31A and a backscatter coefficient local least-value filter processing unit 31B.

The backscatter coefficient smoothing unit 31A is provided with a function to decrease noise components such as a speckle noise, etc. by applying a predetermined smoothing filter, e.g., a median filter, to radar images. The median filter is a filter carrying out a process of arranging values in a local area of k×k in order and using the median value thereof for the output value of a pixel in the center of the area, and the process is expressed by Expression (1).

$$y[m,n]=\operatorname{median}\{x[i,j],(i,j)\in\omega\} \quad (1)$$

Here, y[m,n] expresses a value of a target pixel, and x[i, j] express values of adjacent pixels around the target pixel.

The backscatter coefficient local least-value filter processing unit 31B applies a predetermined local least-value processing filter (hereinafter called a least-value filter) to radar images to extract a least value of a predetermined area. The least-value filter is a filter carrying out a process of using the least value in values in a local area of k×k for the output value of a pixel in the center of the area, and the process is expressed by Expression (2).

$$y[m,n]=\min\{x[i,j],(i,j)\in\omega\} \quad (2)$$

Here, y[m,n] expresses a value of a target pixel, and x[i, j] express values of adjacent pixels around the target pixel.

As described above, the backscatter coefficient smoothing unit 31A and the backscatter coefficient local least-value filter processing unit 31B decrease noise components in radar images and extract least values of predetermined areas, respectively. When these functional blocks are not provided, it is predicted that qualities of radar images deteriorate and accuracy of calculating calibration lines decreases, however, as long as obtained radar images satisfy a required specification, these functional blocks are not necessarily required, and further, it is possible to use either one of them or reverse the processing order.

To calibrate images subsequently taken in series (a second image, a third image, and so on) relative to the initially taken image (first image), the calibration line calculation unit 32 calculates relational expressions (calibration lines) between a backscatter coefficient of the first image and backscatter coefficients of the second image, the third image, and the fourth image, and so on, based on the backscatter coefficient of the first image. The calibration line calculation unit 32 constitutes, together with the backscatter coefficient calibration unit 33, a calibration means and a calibration unit described in Claims.

The backscatter coefficient calibration unit 33 calibrates, using calibration lines calculated by the calibration line calculation unit 32, backscatter coefficients of all pixels of images other than the criterion image, for example, the second image, the third image, and so on.

The growth value calculation unit 34 calculates growth values of vegetation shown in radar images at respective times, such as paddy-field rice coverage, from backscatter coefficients obtained (calibrated) by the backscatter coefficient calibration unit 33, based on information of a growth model (a correlation between backscatter coefficients of radar images and growth values of vegetation shown in the radar images, such as paddy-field rice coverage) stored in the growth model DB 35.

The cultivated field consolidation calculation unit 36 calculates paddy-field rice coverage in units of single cultivated fields based on cultivated field map data stored in the cultivated field map DB 37, and is provided with a cultivated field representative value calculation unit 36A, a cultivated field representative value difference calculation unit 36B, and a growth determination unit 36C.

The cultivated field representative value calculation unit 36A calculates cultivated field representative values in units of single cultivated fields, for example, average values or most-frequently appearing values of paddy-field rice coverage, from paddy-field rice coverage of each pixel constituting one radar image.

The cultivated field representative value difference calculation unit 36B calculates a difference between the cultivated field representative value of a criterion image (for example, the first image) and the cultivated field representative value of a reference image (for example, the second image).

The growth determination unit 36C carries out growth determination (growth is fast or slow) based on cultivated field representative values and differences of cultivated field representative values.

The output unit 38 outputs cultivated field representative values of paddy-field rice coverage, values of cultivated field representative value difference, and results of growth determination in lists in units of cultivated fields or in ranking maps.

[Effects of Correcting (Filter Processing) Backscatter Coefficients]

FIG. 10 and FIG. 11 are diagrams for describing effects of correcting (filter processing) backscatter coefficients of radar images. FIG. 10 shows a case of a parking area of a shopping center on August 11, and FIG. 11 shows a case of a regulation reservoir on August 11.

An image 51B is an image after applying a median filter to an original image (an image before correction) 51A, and an image 51C is an image obtained by applying a least value filter to the image 51B processed by the median filter. The original image 51A has a lot of noises, however, after having been subjected to median filter processing and least value filter processing, noises are removed, and the value of a backscatter coefficient of the pixel in the center thereof is replaced by the least value of backscatter coefficients of adjacent pixels. As a result, backscatter coefficients for use in calculating calibration lines can be stably obtained in the areas where backscatter coefficients are relatively large and fluctuation thereof is relatively small, like a parking area of a shopping center (see arrows).

FIG. 11 shows a case of a regulation reservoir, and an image 52B is an image after applying a median filter to an original image (an image before correction) 52A, and an image 52C is an image obtained by applying a least value filter to the image 52B processed by the median filter. Thus, backscatter coefficients for use in calibration can be stably obtained also in the area like a regulation reservoir (see arrows) where backscatter coefficients are smaller and fluctuation thereof is smaller compared with the parking area of a shopping center shown in FIG. 10.

3. Paddy-Field Rice Growth Forecasting Process

[Operation of a vegetation growth condition analyzer]

Figure 12:
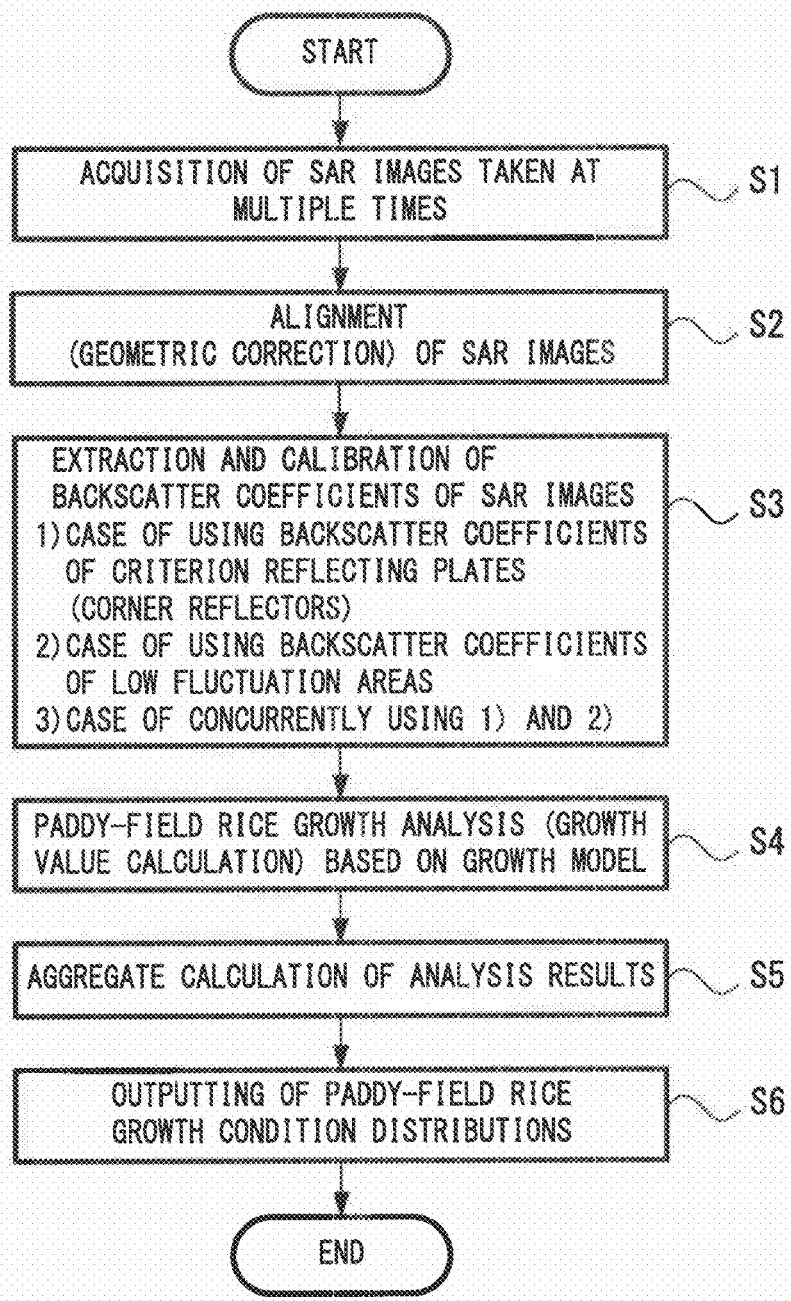
FIG. 12 is a flowchart showing a process of analyzing paddy-field rice growth conditions according to an embodiment of the present invention.

Next, referring to a flowchart shown in FIG. 12, description is made with respect to a paddy-field rice growth condition analysis process by the vegetation growth condition analyzer 20.

Appropriate photo-taking times and places, ground resolutions, etc. are determined by the photo-taking decision unit 22 of the vegetation growth condition analyzer 20 shown in FIG. 5, and information thereof is transmitted to the satellite SAR 11 via the I/F unit 21. In the I/F unit 21, SAR images (radar images) taken by the satellite SAR 11 are received from the satellite SAR 11 (step S1). Received radar images at respective photo-taking times are stored in the map DB 26 by the radar image storage unit 24.

Then, the alignment unit 25 carries out alignment, using a radar image taken first and stored in the map DB 26 as the criterion image, such that radar images (of the same target area) taken at the next or other times are superimposed on the criterion image, respectively (step S2). In such alignment, geometric correction is carried out such that images are superimposed on a map stored in the map DB 26, using points appearing in images as criterion points, such as ground control points (GCP) which are clear in latitude and longitude, intersections, buildings, etc.

After completion of alignment, processing (extraction) and calibration of backscatter coefficients of radar images at multiple times are carried out according to respective cases (step S3).

First, description is made with respect to the case of using backscatter coefficients of criterion reflecting plates such as corner reflectors in radar images.

The criterion reflecting plate backscatter coefficient extraction unit 27 extracts backscatter coefficient values of corner reflectors (criterion reflecting plates) appearing in radar images at multiple times, calibration lines based on a backscatter coefficient value of a criterion reflecting plate in a criterion image are obtained, and based on the obtained calibration lines, backscatter coefficient values of radar images taken at the following and subsequent times are processed (calibrated). At this time, the backscatter coefficient discrimination processing unit 28 determines if backscatter coefficients of criterion reflecting plates processed (extracted) by the criterion reflecting plate backscatter coefficient extraction unit 27 can be used, and when the extracted backscatter coefficient values are in a saturated condition, the backscatter coefficients processed (extracted) by the criterion reflecting plate backscatter coefficient extraction unit 27 are not used. On the other hand, when the extracted backscatter coefficient values are not in a saturated condition, the backscatter coefficients processed (extracted) by the criterion reflecting plate backscatter coefficient extraction unit 27 are provided to the backscatter coefficient storage unit 30 while being associated with respective photo-taking times of radar images.

Then, information of backscatter coefficients stored in the backscatter coefficient storage unit 30 is subjected to filter processing so that noise components are reduced by the backscatter coefficient smoothing unit 31A and the backscatter coefficient local least-value filter processing unit 31B of the calibration backscatter coefficient calculation unit 31, and then backscatter coefficient values of representative areas (i.e., criterion reflecting plates) in radar images are obtained, and thereafter the obtained backscatter coefficient values are provided to the calibration line calculation unit 32. At the calibration line calculation unit 32, calibration lines are calculated based on backscatter coefficients of multiple pixels of a criterion reflecting plate in the criterion image and backscatter coefficients of multiple pixels of criterion reflecting plates in other radar images, each of the criterion reflecting plates in other radar images corresponding to the criterion reflecting plate in the criterion image. Information of these calibration lines is provided to the backscatter coefficient calibration unit 33, and based on the provided calibration lines, backscatter coefficients of other radar images are calibrated. Such calibration processing is carried out to radar images at multiple times.

Secondly, description is made with respect to the case of using backscatter coefficients of low fluctuation areas in radar images.

In this case, backscatter coefficient values, which will be used as the calibration basis, are extracted from obtained radar images. The terrestrial object backscatter coefficient extraction unit 29 calculates backscatter coefficients of terrestrial objects appearing in radar images, and extracts image areas in which backscatter coefficients are relatively large and fluctuation thereof is relatively small (for example, artificial structures) and image areas in which backscatter coefficients are relatively small and fluctuation thereof is relatively small (for example, a pond, a playground). Backscatter coefficient values of these image areas in which fluctuation of backscatter coefficients is relatively small, i.e., low fluctuation areas, are provided to the backscatter coefficient storage unit 30 while being associated with respective photo-taking times of radar images.

Then, information of backscatter coefficients stored in the backscatter coefficient storage unit 30 is subjected to filter processing by the backscatter coefficient smoothing unit 31A and the backscatter coefficient local least-value filter processing unit 31B, as in the above-described first case, and is then provided to the calibration line calculation unit 32. At the calibration line calculation unit 32, backscatter coefficients of low fluctuation areas appearing in radar images are obtained, and based on backscatter coefficients of multiple pixels of a low fluctuation area appearing in the criterion image and backscatter coefficients of multiple pixels of low fluctuation areas appearing in other radar images, each low fluctuation area in other radar images corresponding to the low fluctuation area appearing in the criterion image, calibration lines are calculated. Information of these calibration lines is provided to the backscatter coefficient calibration unit 33, and based on the calibration lines, backscatter coefficients of other radar images are calibrated. Such calibration processing is carried out to radar images at multiple times.

Thirdly, description is made with respect to the case of concurrently using backscatter coefficients of criterion reflecting plates such as corner reflectors, etc. in radar images, described above firstly, and backscatter coefficients of low fluctuation areas in radar images, described above secondly.

In this case, the calibration line calculation unit 32 calculates calibration lines, selectively using data of backscatter coefficients of low fluctuation areas in radar images as in the second case above and data of backscatter coefficients of criterion reflecting plates such as corner reflectors in radar images as in the first case above, depending on conditions of image areas in a criterion image, in which fluctuation of backscatter coefficients is relatively small. That is, a low fluctuation area is extracted from the criterion image, and when the extracted low fluctuation area corresponds to a criterion reflecting plate, calibration lines are calculated using a backscatter coefficient of the extracted low fluctuation area (i.e., criterion reflecting plate) and backscatter coefficients of criterion reflecting plates appearing in other radar images, each criterion reflecting plate in other radar images corresponding to the criterion reflecting plate appearing in the criterion image, and when the extracted low fluctuation area corresponds to an artificial structure, etc., calibration lines are calculated using a backscatter coefficient of the extracted low fluctuation area (i.e., artificial structure, etc.) and backscatter coefficients of artificial structures, etc. in other radar images, each artificial structure, etc. in other radar images corresponding to the artificial structure, etc. in the criterion image. Information of the calibration lines is provided to the backscatter coefficient calibration unit 33, and based on the calibration lines, backscatter coefficients of other radar images are calibrated. Such calibration processing is carried out to radar images at multiple times.

Then, paddy-field rice growth analysis (growth value calculation) based on a growth model is carried out by the growth value calculation unit 34 (step S4). Analysis of growth conditions of paddy-field rice is carried out based on a model of backscatter coefficient values and growth information (e.g., growth value) obtained in advance, using radar images having been subjected to calibration of backscatter coefficients using calibration lines. That is, based on information about correlation of vegetation growth values and backscatter coefficients of radar images, stored in the growth model DB 35, growth values of vegetation appearing in pixels of respective radar images are calculated based on calibrated backscatter coefficients of the radar images.

After completing paddy-field rice growth analysis, the cultivated field consolidation calculation unit 36 carries out aggregate calculation of analysis results (step S5). For example, when average values of paddy-field rice coverage or most-frequently appearing values in units of single cultivated fields have been obtained with the cultivated field representative value calculation unit 36A, based on analysis results, from paddy-field rice coverage of each pixel constituting one radar image, growth conditions of each cultivated field can be grasped.

Also, when a difference between the cultivated field representative value of a criterion image (for example, the first image) and the cultivated field representative value of a reference image (for example, the second image) has been obtained by the cultivated field representative value difference calculation unit 36B, a growth difference between two times can be grasped with respect to each cultivated field.

Further, when growth determination for respective cultivated fields has been carried out by the growth determination unit 36C based on cultivated field representative values and values of cultivated field representative value difference, a growth speed difference between cultivated fields can be grasped.

Then, the output unit 38 outputs paddy-field rice growth condition distributions (step S6). That is, cultivated field representative values of paddy-field rice coverage, values of cultivated field representative value difference, and results of growth determination are outputted in lists in units of cultivated fields or in ranking maps. Maps representing such paddy-field rice growth condition distributions are called paddy-field rice growth condition distribution maps.

Paddy-field rice growth condition distribution maps can be used for agricultural management coaching matched to individual user's actual conditions by carrying out aggregation calculation of information for each unit of agricultural management coaching, such as a pixel unit, a cultivated field unit, a cultivated field segmented unit, etc.

In order to carry out aggregation calculation in units of cultivated fields based on pixel units, data of shapes of cultivated fields, for example geographical information data, is used. Geographical information data of target areas is stored in the map DB 26, etc.

4. Measurement Results, etc.

Figure 13A:
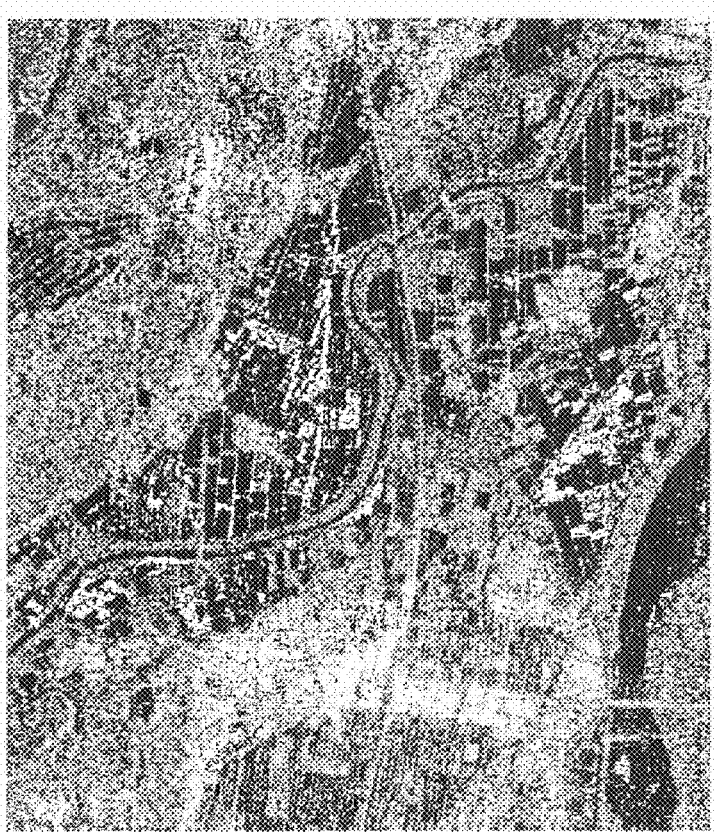
FIG. 13A is a diagram showing a radar image (on August 11) after having been subjected to calibration of backscatter coefficients.
Figure 13B:
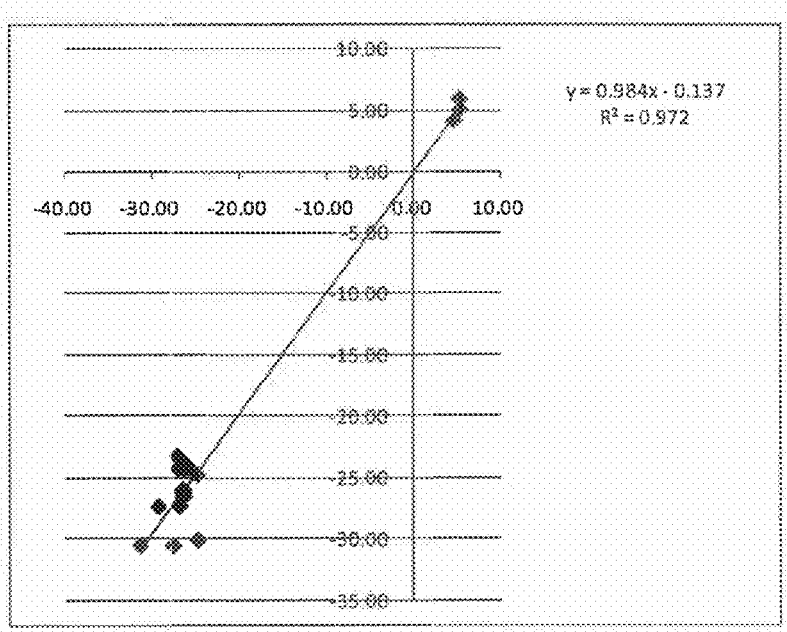
FIG. 13B is a diagram showing a calibration line used for the calibration.

FIG. 13A and FIG. 13B are diagrams for describing a result of calibrating data of backscatter coefficients of a radar image taken on August 11 based on a radar image taken at a predetermined time (in this example, May 7) (step S3 of FIG. 12). FIG. 13A shows a radar image at a target time (in this example, August 11) after calibration, and FIG. 13B shows a calibration line used in calibration of the radar image shown in FIG. 13A. Note that in the example shown in FIG. 13B, the graph (calibration line) has been developed using a radar image taken at the first photo-taking time when the backscatter coefficient becomes the smallest (i.e., May 7) as a criterion image, however, the calibration line can be developed using for the criterion image, a radar image taken on August 11 when the backscatter coefficient will become the largest as described later.

FIG. 13B shows a calibration line for use in calibrating data of backscatter coefficients of the radar image taken on August 11, which has been developed based on the radar image on May 7 (criterion image). The vertical axis indicates a backscatter coefficient of the radar image on May 7 (criterion image), and the horizontal axis indicates a backscatter coefficient of the radar image on August 11. In this example, the calibration line (regression line) is expressed by the following expression. Here, y is the backscatter coefficient of the criterion image on May 7, x is the backscatter coefficient of the image for calibration on August 11, and $R^2$ is a determination coefficient. Note that data shown in FIG. 13B is the one after the least value filter has been applied.

$$y=0.984x-0.137$$

$$R^2=0.972$$

Similarly, backscatter coefficients of radar images taken at respective times are calibrated by calibration lines for respective times generated based on a backscatter coefficient of a radar image taken at a predetermined time (in this example, May 7). Because backscatter coefficients of radar images are thus calibrated, growth values which indicate accurate growth conditions of paddy-field rice (vegetation such as agricultural produce, etc.) at respective times can be calculated.

Next, description is made with respect to a radar backscatter coefficient distribution map of a cultivated field.

Figure 14:
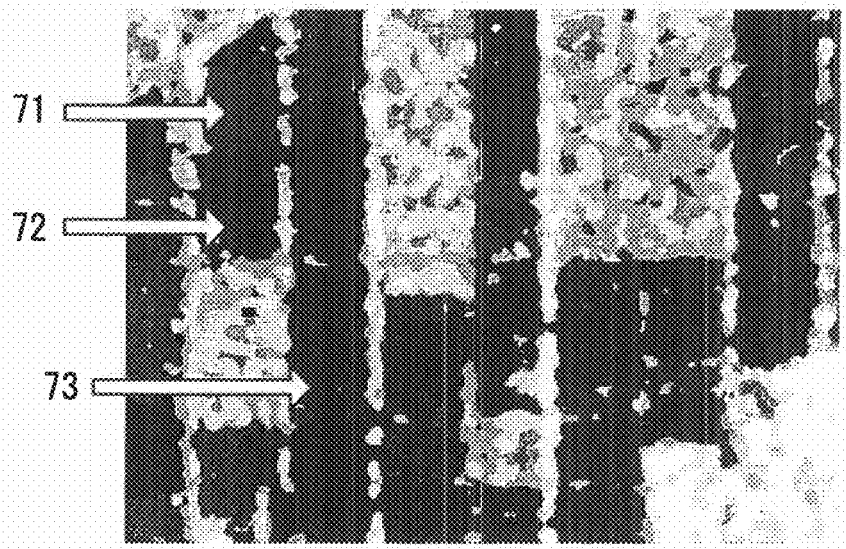
FIG. 14 is a diagram showing an example of a backscatter coefficient distribution map of cultivated fields.

FIG. 14 shows distribution of radar backscatter coefficients of cultivated fields (paddy-field rice planting cultivated fields), and is an enlarged diagram of the main portion of a radar backscatter coefficient distribution map of a whole target area including multiple cultivated fields. In the enlarged radar backscatter coefficient distribution map of FIG. 14, cultivated fields 71, 72, 73 are included. Thus, growth conditions of agricultural produce in arbitrary areas of a radar image can be finely confirmed in units of pixels.

Figure 15:
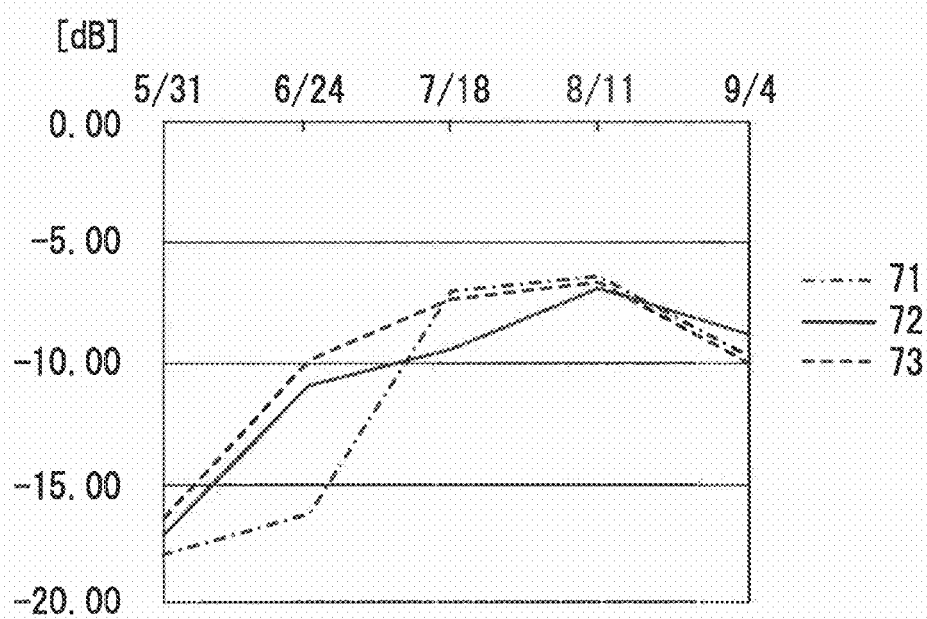
FIG. 15 is a diagram showing changes with passage of time of average backscatter coefficients of paddy-field rice planting cultivated fields.

FIG. 15 is a graph showing changes with lapse of time of average backscatter coefficients corresponding to the radar backscatter distribution map of paddy-field rice planting cultivated fields shown in FIG. 14. The average backscatter coefficient is an average value of backscatter coefficients obtained from multiple pixels constituting an area in a radar image. Paddy-field rice in the cultivated fields 71, 72, 73 gradually grow after rice planting, and as a result, backscatter coefficients of respective cultivated fields increase, which then decrease after reaching maximum points on August 11. It is presumed that this is because backscatter has decreased due to ear-emerging (heading) and ear-hanging down. From the graph of FIG. 15, it can be grasped that paddy-field rice of the cultivated field 73 for example grows early and paddy-field rice of the cultivated field 71 grows late.

Observation targets of the present invention include agricultural produce and vegetation including not only paddy-field rice but also corn, barley, etc., in which backscatter coefficients change according to morphology change accompanied with growth stages, and with respect to vegetation on the surface of the ground, by observing radar images taken at multiple times of a year, that have been subjected to backscatter coefficient calibration using a criterion image, and a radar backscatter coefficient distribution map (vegetation growth condition distribution map) generated from the radar images after having been subjected to backscatter coefficient calibration, growth conditions of vegetation can be determined in real time and accurately.

According to the above-described embodiment, calibration lines for radar images at respective times are calculated based on a backscatter coefficient of a radar image at a predetermined time, and backscatter coefficients of radar images taken at respective times are calibrated by calculated calibration lines for respective times. And, based on the calibrated backscatter coefficients, growth values of vegetation shown in radar images at respective times are calculated. Therefore, accurate growth conditions of vegetation such as agricultural produce, etc. at respective times can be known.

Also, because radar images taken using microwaves from a flying body such as an artificial satellite are weatherproof, it is possible to grasp growth conditions of vegetation such as agricultural produce, etc. even in a rainy season from May (rice transplanting) to August (heading or ear-emerging).

Also, by grasping growth conditions over multiple times accurately and in real time, timely and appropriate cultivation management of vegetation such as agricultural produce, etc., determination of the time for putting in additional manure, and so on become feasible.

Also, by grasping growth conditions over multiple times accurately and in real time, prevention of disease/insect breakout and dealing with growth disturbance and disaster become possible.

Further, the investigation of paddy-field rice harvest conditions based on field studies conducted by public offices, etc. becomes possible by an observation device (e.g., remote sensing).

5. Others

Note that a series of processing carried out in the above-described vegetation growth condition analyzer can be executed by hardware, and also by software. It is needless to say that the function of executing the series of processing can be realized by the combination of hardware and software. When causing the series of processing to be executed by software, a program constituting the software is installed from a program recording medium into a computer incorporated in dedicated hardware or a general-purpose computer capable of executing various kinds of functions by installing various programs.

Figure 16:
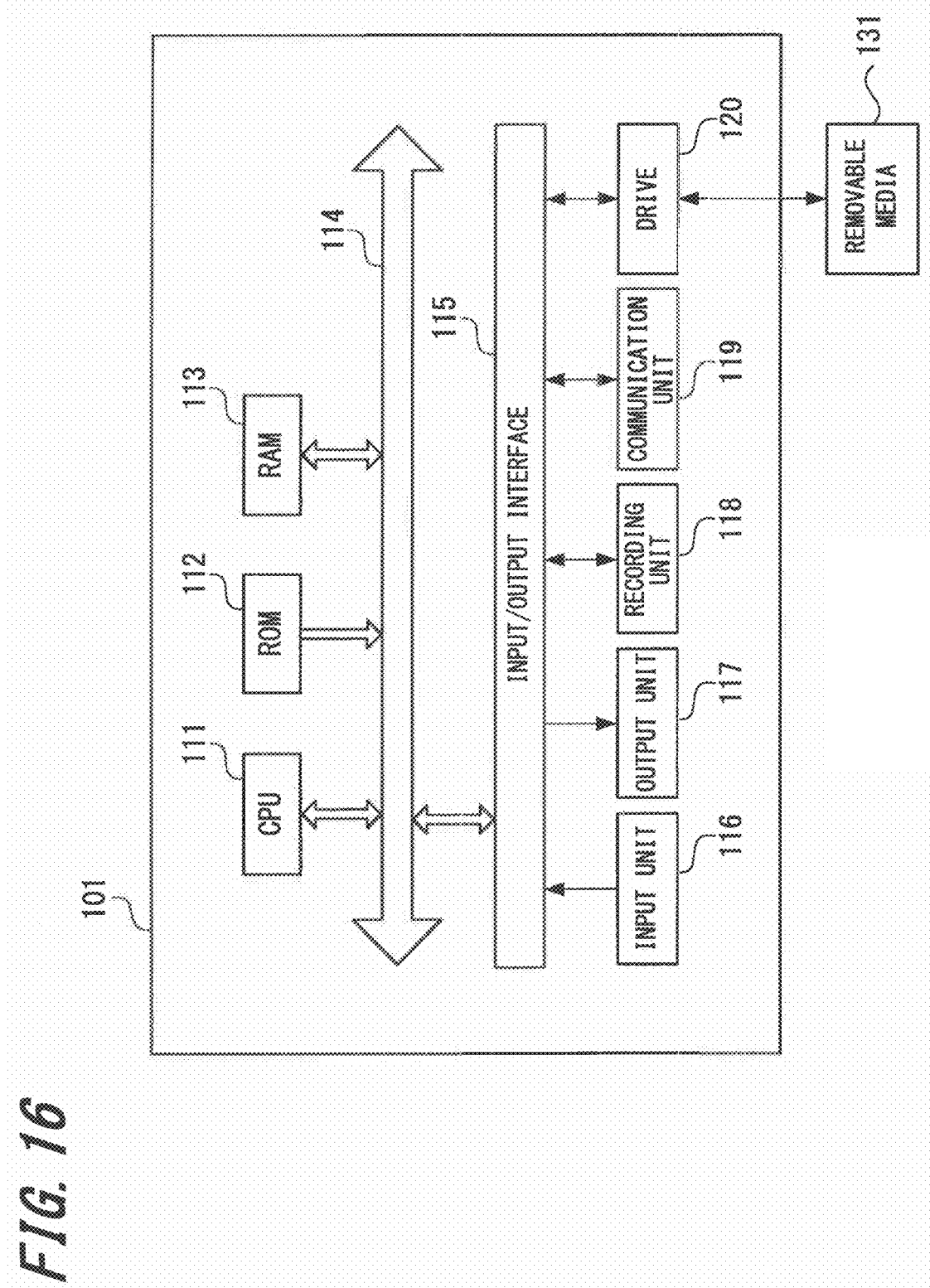
FIG. 16 is a block diagram showing an example of the internal structure of a personal computer.

FIG. 16 is a block diagram showing an exemplary configuration of a computer which executes the above-described series of processing by a program. A computer 101 may be a personal computer having given performance, besides a dedicated computer highly sophisticated for executing a series of processing.

A CPU (Central Processing Unit) 111 of the computer 101 carries out various kinds of processing besides the above-described series of processing according to a program stored in a ROM (Read Only Memory) 11 or a recording unit 118. A RAM (Random Access Memory) 113 stores as needed, programs which the CPU 111 executes, data, and so on. The CPU 111, the ROM 112, and the RAM 113 are connected with each other by a bus 114.

An input/output interface 115 is connected to the CPU 111 via the bus 114. An input unit 116 constituted by a keyboard, a mouse, a microphone, etc., and an output unit 117 which is constituted by a display, a speaker, and so on are connected with the input/output interface 115. The CPU 111 executes various kinds of function in response to instructions input from the input unit 116. The CPU 111 outputs processing results to the output unit 117.

The recording unit 118 connected to the input/output interface 115 is constituted, for example, by a hard disk, and records programs which the CPU 111 executes, and various data.

A communication unit 119 communicates with external devices through a network such as the Internet, a local area network, etc. Programs may be obtained through the communication unit 119, and recorded in the recording unit 118.

A drive 120 connected with the input/output interface 115 drives a removable media 131 when installed, such as a magnetic disk, an optical disk, a magneto-optical disk, a semiconductor memory, and so on, and obtains programs and data stored therein. Obtained programs and data are transferred to the recording unit 118 as needed, and are recorded therein.

A program recording medium storing a program, which is installed in a computer and put in an executable condition by the computer, is provided by a removable medium 131 as a packaged medium as illustrated in FIG. 16. As the removable medium 131, a magnetic disk (including a flexible disk), an optical disk (including a CD-ROM; Compact Disc Read Only Memory, a DVD; Digital Versatile Disc, a magneto-optical disk), or a semiconductor memory can be applied. Alternatively, the program recording medium is constituted by the ROM 112 in which a program is temporarily or permanently stored, a hard disk constituting the recording unit 118, and so on.

Storing of programs into the program recording medium is carried out, through the communication unit 119, which is an interface such as a router, a modem, etc., using a wired or wireless communication medium, such as a local area network (LAN), the Internet, digital satellite broadcasting, etc.

Note that in the present specification, processing steps describing a program which is stored in a program recording medium include not only processing carried out in chronological order along the described order, but also, even if they are not processed in chronological order, processing to be executed in parallel or individually (for example, parallel processing or object processing).

Also, the program may be the one which will be processed by one computer, or the one which will be processed by multiple computers in a distributed manner. Furthermore, the program may be the one which will be transferred to a remote computer to be executed there.

The above-described embodiment is a concrete example of preferred embodiments for carrying out the present invention, so that various limitations which are technically preferable are put. However, the present invention is not limited to these embodiments as long as no description is particularly made in describing embodiments to the effect that the present invention is limited. Accordingly, processing time, processing order, numerical conditions for parameters, and so on presented in the above-described description are only preferred examples, and dimensions, shapes, and arrangement relationships, etc. in respective diagrams used for description are schematic ones showing examples of embodiments. Accordingly, the present invention is not limited to the above-described examples of embodiments, and various modifications and changes are possible without departing the gist of the present invention.

| Explanation of Symbols | |
|---|---|
| 20: | Vegetation growth condition analyzer |
| 21: | I/F unit |
| 22: | Photo-taking decision unit |
| 23A: | Growth calendar DB |
| 23B: | Photo-taking plan DB |
| 24: | Radar image storage unit |
| 25: | Alignment unit |
| 26: | Map DB |
| 27: | Criterion reflecting plate backscatter coefficient extraction unit |
| 28: | Backscatter coefficient discrimination processing unit |
| 29: | Terrestrial object backscatter coefficient extraction unit |
| 30: | Backscatter coefficient storage unit |
| 31: | Calibration backscatter coefficient calculation unit |
| 31A: | Backscatter coefficient smoothing unit |
| 31B: | Backscatter coefficient local least-value filter processing unit |

| | Explanation of Symbols |
|---|---|
| 32: | Calibration line calculation unit |
| 33: | Backscatter coefficient calibration unit |
| 34: | Growth value calculation unit |
| 35: | Growth model DB |
| 36: | Cultivated field consolidation calculation unit |
| 36A: | Cultivated field representative value calculation unit |
| 36B: | Cultivated field representative value difference calculation unit |
| 36C: | Growth determination unit |
| 37: | Cultivated field map DB |
| 38: | Output unit |

The invention claimed is:

1. A vegetation growth condition analysis method implemented by at least one processor and comprising the steps of:
acquiring a plurality of radar images of a ground surface of a same target area taken at multiple times of a year by a radar device mounted on a flying body;
storing the plurality of radar images acquired in the acquiring step in a map database;
while using as a criterion image a radar image of the plurality of radar images stored in the map database, taken at a predetermined time in the multiple times of a year, aligning other radar images than the criterion image of the plurality of radar images, taken at other times than the predetermined time in the multiple times of a year, with the criterion image, respectively;
extracting backscatter coefficients in specified areas of the plurality of radar images;
based on a backscatter coefficient of a specified area in the criterion image of the plurality of radar images stored in the map database, calibrating backscatter coefficients of other radar images than the criterion image of the plurality of radar images; and
based on a correlation between backscatter coefficients of radar images and growth values of vegetation shown in the radar images, calculating, using the at least one processor, growth values of vegetation shown in other radar images than the criterion image of the plurality of radar images, whose backscatter coefficients have been calibrated in the calibrating step, from the backscatter coefficients thereof calibrated in the calibrating step,
wherein the calibrating step further includes:
calculating, based on a backscatter coefficient of a specified area in the criterion image of the plurality of radar images stored in the map database and backscatter coefficients of specified areas of other radar images than the criterion image of the plurality of radar images, the specified areas of other radar images of the plurality of radar images each corresponding to the specified area in the criterion image, calibration lines for calibrating backscatter coefficients of other radar images than the criterion image of the plurality of radar images, and
calibrating, based on the calibration lines calculated in the calibration line calculating step, backscatter coefficients of other radar images than the criterion image of the plurality of radar images.

2. The vegetation growth condition analysis method according to claim 1,
wherein in the extracting step, backscatter coefficients of low-fluctuation areas in the plurality of radar images, in which fluctuation of backscatter coefficients according to times of a year is relatively small, are extracted, the low-fluctuation areas corresponding to terrestrial objects present in the target area, the criterion reflecting plate excepted; and
wherein in the calibration line calculating step, the calibration lines are calculated from a backscatter coefficient of a low-fluctuation area in the criterion image and backscatter coefficients of low fluctuation areas in other radar images than the criterion image of the plurality of radar images, the low fluctuation areas in other radar images of the plurality of radar images each corresponding to the low-fluctuation area in the criterion image.

3. The vegetation growth condition analysis method according to claim 1,
wherein a criterion reflecting plate is provided in a predetermined position on the ground surface of the target area,
wherein in the extracting step, backscatter coefficients of criterion reflecting plates in the plurality of radar images are extracted; and
wherein in the calibration line calculating step, the calibration lines are calculated from a backscatter coefficient of a criterion reflecting plate in the criterion image and backscatter coefficients of criterion reflecting plates in other radar images than the criterion image of the plurality of radar images, the criterion reflecting plates in other radar images of the plurality of radar images each corresponding to the criterion reflecting plate in the criterion image.

4. The vegetation growth condition analysis method according to claim 1,
wherein a criterion reflecting plate is provided in a predetermined position on the ground surface of the target area,
wherein in the extracting step, backscatter coefficients of low-fluctuation areas in the plurality of radar images, in which fluctuation of backscatter coefficients according to times of a year is relatively small, are extracted, the low-fluctuation areas corresponding to terrestrial objects present in the target area, the criterion reflecting plate excepted, or backscatter coefficients of criterion reflecting plates in the plurality of radar images are extracted; and
wherein in the calibration line calculating step, the calibration lines are calculated from a backscatter coefficient of a low-fluctuation area in the criterion image and backscatter coefficients of low fluctuation areas in other radar images than the criterion image of the plurality of radar images, the low fluctuation areas in other radar images than the criterion image of the plurality of radar images each corresponding to the low-fluctuation area in the criterion image, or from a backscatter coefficient of a criterion reflecting plate in the criterion image and backscatter coefficients of criterion reflecting plates in other radar images than the criterion image of the plurality of radar images, the criterion reflecting plates in other radar images of the plurality of radar images each corresponding to the criterion reflecting plate in the criterion image.

5. The vegetation growth condition analysis method according to claim 1, wherein the predetermined time is a first time in the multiple times.

6. The vegetation growth condition analysis method according to claim 3, further comprising the step of:
determining whether or not the backscatter coefficients of the criterion reflecting plates in the plurality of radar images, which have been extracted in the extracting step, are in a saturated condition, and when the backscatter coefficients are in a saturated condition, determining not to use the backscatter coefficients in calculating the calibration lines in the calibration line calculating step.

7. The vegetation growth condition analysis method according to claim 1, further comprising the step of:
calculating growth values of vegetation shown in the plurality of radar images in units of agricultural fields based on an agricultural field map stored in an agricultural field map database storing agricultural field maps, while using the growth values calculated in the growth value calculating step.

8. The vegetation growth condition analysis method according to claim 1, wherein the growth values of vegetation represent paddy-field rice coverage, respectively.

9. A non-transitory computer readable recording medium recording thereon a computer program that when executed by a computer causes the computer to function as:
an acquiring means acquiring a plurality of radar images of a ground surface of a same target area taken at multiple times of a year by a radar device mounted on a flying body;
a storing means storing the plurality of radar images acquired by the acquiring means in a map database;
an aligning means aligning, while using as a criterion image a radar image of the plurality of radar images stored in the map database, taken at a predetermined time in the multiple times of a year, other radar images than the criterion image of the plurality of radar images, taken at other times than the predetermined time in the multiple times of a year, with the criterion image, respectively;
an extracting means extracting backscatter coefficients in specified areas of the plurality of radar images;
a calibrating means calibrating backscatter coefficients of other radar images than the criterion image of the plurality of radar images stored in the map database based on a backscatter coefficient of a specified area in the criterion image of the plurality of radar images; and
a calculating means calculating growth values of vegetation shown in other radar images than the criterion image of the plurality of radar images, whose backscatter coefficients have been calibrated by the calibrating means, from the backscatter coefficients thereof calibrated by the calibrating means, based on a correlation between backscatter coefficients of radar images and growth values of vegetation shown in the radar images,
wherein the calibrating means further:
calculates, based on a backscatter coefficient of a specified area in the criterion image of the plurality of radar images stored in the map database and backscatter coefficients of specified areas of other radar images than the criterion image of the plurality of radar images, the specified areas of other radar images of the plurality of radar images each corresponding to the specified area in the criterion image, calibration lines for calibrating backscatter coefficients of other radar images than the criterion image of the plurality of radar images, and
calibrates, based on the calculated calibration lines, backscatter coefficients of other radar images than the criterion image of the plurality of radar images.

10. A vegetation growth condition analyzer comprising:
an acquisition hardware unit configured to acquire a plurality of radar images of a ground surface of a same target area taken at multiple times of a year by a radar device mounted on a flying body;
a storage hardware unit configured to store the plurality of radar images acquired by the acquisition hardware unit in a map database; and
at least one hardware unit implementing
an alignment hardware unit configured to align, while using as a criterion image a radar image of the plurality of radar images stored in the map database, taken at a predetermined time in the multiple times of a year, other radar images than the criterion image of the plurality of radar images, taken at other times than the predetermined time in the multiple times of a year, with the criterion image, respectively,
an extraction hardware unit configured to extract backscatter coefficients of specified areas in the plurality of radar images,
a calibration hardware unit configured to calibrate backscatter coefficients of other radar images than the criterion image of the plurality of radar images stored in the map database based on a backscatter coefficient of a specified area in the criterion image of the plurality of radar images, and
a calculation hardware unit configured to calculate growth values of vegetation shown in other radar images than the criterion image of the plurality of radar images, whose backscatter coefficients have been calibrated by the calibration hardware unit, from the backscatter coefficients thereof calibrated by the calibration hardware unit, based on a correlation between backscatter coefficients of radar images and growth values of vegetation shown in the radar images,
wherein the calibration hardware unit is further configured to:
calculate, based on a backscatter coefficient of a specified area in the criterion image of the plurality of radar images stored in the map database and backscatter coefficients of specified areas of other radar images than the criterion image of the plurality of radar images, the specified areas of other radar images of the plurality of radar images each corresponding to the specified area in the criterion image, calibration lines for calibrating backscatter coefficients of other radar images than the criterion image of the plurality of radar images, and
calibrate, based on the calculated calibration lines, backscatter coefficients of other radar images than the criterion image of the plurality of radar images.

11. The vegetation growth condition analysis method according to claim 1, wherein the predetermined time is a first time in the multiple times.

12. The vegetation growth condition analysis method according to claim 2, wherein the predetermined time is a first time in the multiple times.

13. The vegetation growth condition analysis method according to claim 3, wherein the predetermined time is a first time in the multiple times.

14. The vegetation growth condition analysis method according to claim 4, wherein the predetermined time is a first time in the multiple times.

15. The vegetation growth condition analysis method according to claim 4, further comprising the step of:
determining whether or not the backscatter coefficients of the criterion reflecting plates in the plurality of radar images, which have been extracted in the extracting step, are in a saturated condition, and when the backscatter coefficients are in a saturated condition, determining not to use the backscatter coefficients in calculating the calibration lines in the calibration line calculating step.

* * * * *